Figure 1:
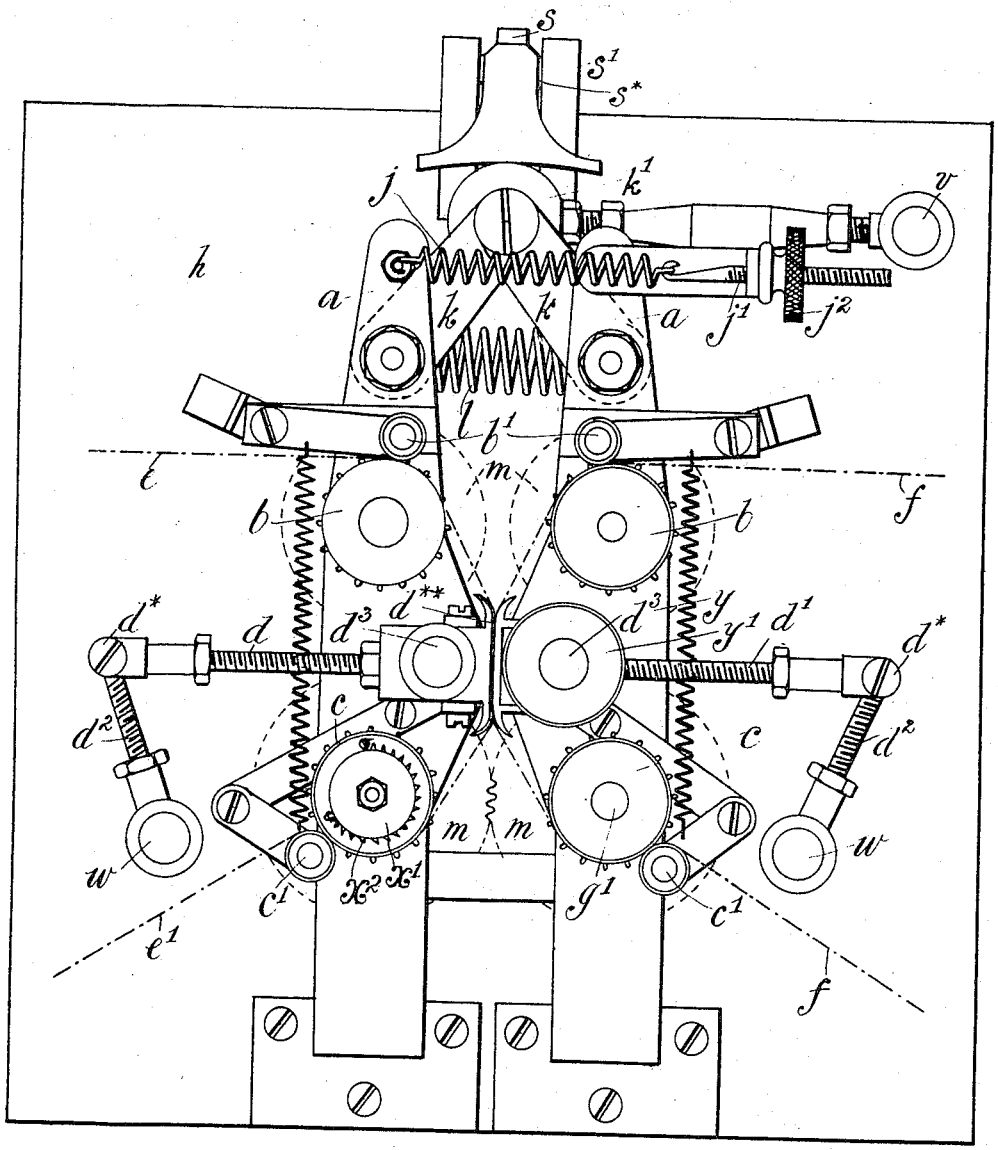

P. E. STOW.
METHOD OF COLORING FILMS.
APPLICATION FILED NOV. 22, 1913.

1,130,645.

Patented Mar. 2, 1915.
3 SHEETS—SHEET 1.

P. E. STOW.
METHOD OF COLORING FILMS.
APPLICATION FILED NOV. 22, 1913.

1,130,645.

Patented Mar. 2, 1915.

3 SHEETS—SHEET 2.

Witnesses:—

Inventor:—
P. E. Stow.

UNITED STATES PATENT OFFICE.

PERCIVAL E. STOW, OF CROYDON, ENGLAND, ASSIGNOR OF ONE-THIRD TO HARRY MARTIN VALENTINE SHARP, OF CROYDON, ENGLAND, AND ONE-THIRD TO HENRY VASSAR LAWLEY, OF BATTERSEA PARK, LONDON, ENGLAND.

METHOD OF COLORING FILMS.

1,130,645.  Specification of Letters Patent.  Patented Mar. 2, 1915.

Application filed November 22, 1913. Serial No. 802,563.

*To all whom it may concern:*

Be it known that I, PERCIVAL EDWIN STOW, subject of George V, King of Great Britain and Ireland, and resident of 173 St. James road, Croydon, in the county of Surrey, England, has invented a certain new and useful Method of Coloring Films, Applicable also to Photography and other Analogous Purposes.

This invention is chiefly concerned with the production of colored cinematograph films, in connection with which it will now be described.

In carrying out this invention, according to one method I take a positive print in the ordinary way from a negative and, placing this in a projecting apparatus, throw a picture, which is by preference considerably enlarged, on to a ground glass or the like screen conveniently placed horizontally. I then mask off or block out the whole of the picture except the portions or portion, *e. g.* a person's dress, which it is desired to color. This may be done by cutting a stencil in non-actinic paper, celluloid or other suitable material, the cut out portion corresponding to the shape of the dress; or by applying a band of paint of suitable color around and up to the outline of the dress and covering the surrounding portion of the picture with paper or the like; or by completely painting out the picture surrounding the dress; or in any other suitable manner. By means of a bright light of constant power, which may be obtained by reflection from a concave parabolic whitened surface, I may now proceed to photograph the stencil on to a sensitized film placed in a camera and arrange that the image focused in the camera is of the same size as the original in the picture so that, when the image and the picture are superimposed, they shall exactly correspond. Successive pictures are similarly treated—the shape of the stencil being altered when necessary to correspond to alteration in shape of the pictures—and in the camera I eventually obtain a length of film in which are photographed successive images of the dress. The non-actinic paper or the like may be carried on spools. For the purpose of carrying out the projection and photographic processes above described it is convenient to provide mechanism which, after the stencil has been made, switches off the light from the said projecting apparatus, switches on the light for illuminating the stencil, opens the camera shutter by means of suitable timing mechanism, for instance, clock-work, so as to give the required exposure, switches off the light for illuminating the stencil, advances the films a picture-length, and finally again switches on the light in said projection apparatus so as to project the fresh picture on to the said screen, whereupon the operations are repeated. Instead of photographing the stencil in the apparatus in which it is produced, it may be photographed in any other suitable manner and at any subsequent time. The camera exposure (which we may term the "print-plate") is then developed and after drying in the usual way is introduced into a bichromate solution which renders the gelatin in which the silver image is deposited insoluble. The other portions of the gelatin being soluble however are washed off in hot water leaving a clear cut image of the dress remaining on a celluloid base, this image being very tough. As it is desired that the image on the print-plate shall be as even as possible, it will be understood that if the portion of the picture to be colored has any pattern or shading on it, and the light from the said projection apparatus were used to illuminate the stencil for the purpose of exposing the print-plate, the image on the latter would not be of uniform density, and consequently would not take up the dye evenly. Hence it is preferable to employ a separate source of light for illuminating the stencil. Where, however, plain surfaces are to be colored, the light from the said projection apparatus may be used for illuminating the stencil. Instead of producing the print-plate in accordance with the above-described procedure, I may employ a stencil made in celluloid or other suitable material of the actual size of the image and, after suitably treating the area around the stencil, to make it opaque, print by contact or otherwise on to the sensitized film which, after it has been developed, forms the print-plate. It is now washed and dried, the gelatin in which the silver image is deposited is rendered insoluble, and the gelatin surrounding the image is washed off, thereby leaving the image on the celluloid or other base. In cases where the stencil is made actual size, and contains any projections which are liable to curl or become distorted, and thus make it difficult to obtain a correct print or photograph of the stencil I, in accordance with this invention, place the stencil between transparent sheets of glass or other suitable material in order to keep it flat so that a correct print or photograph of it may be obtained. The print-plate is now placed in a suitable dye and subsequently placed in temporary contact with the original picture. The result is that the dye rapidly leaves the moist gelatin of the print-plate and permeates the dry image of the original. Thus the dress becomes colored. Alternatively, the positive may be moistened and, if necessary, introduced into alcohol or other medium to prevent the dye spreading when the films are brought together. The machine for this purpose may be constructed to either press or roll the two films together so as to obtain perfect contact, and be provided with registering means which compensate for any difference which may exist in the two films as to perforation or shrinkage, etc. Thus one color is transferred and caused to exactly superimpose upon the image in the original. When others are desired the same process may be followed out again from the commencement and another dye may be applied to another portion of the picture by means of another similarly constructed print-plate. Alternatively the original positive print may be first toned chemically or stained with dyes, the former method being selective and effecting the image and not those parts where no metal deposit exists and the latter effecting the color of the whole picture—the clear parts as well as the image, or the image may be bleached and selective dyes used for obtaining a colored image. After the picture has by one or both of these means been colored a two or three color effect may be obtained by means of a print-plate as above described. Again by superimposing one or more dyes by means of print-plates successively applied a variety of tints can be obtained by combining the colored dyes.

Figure 2:
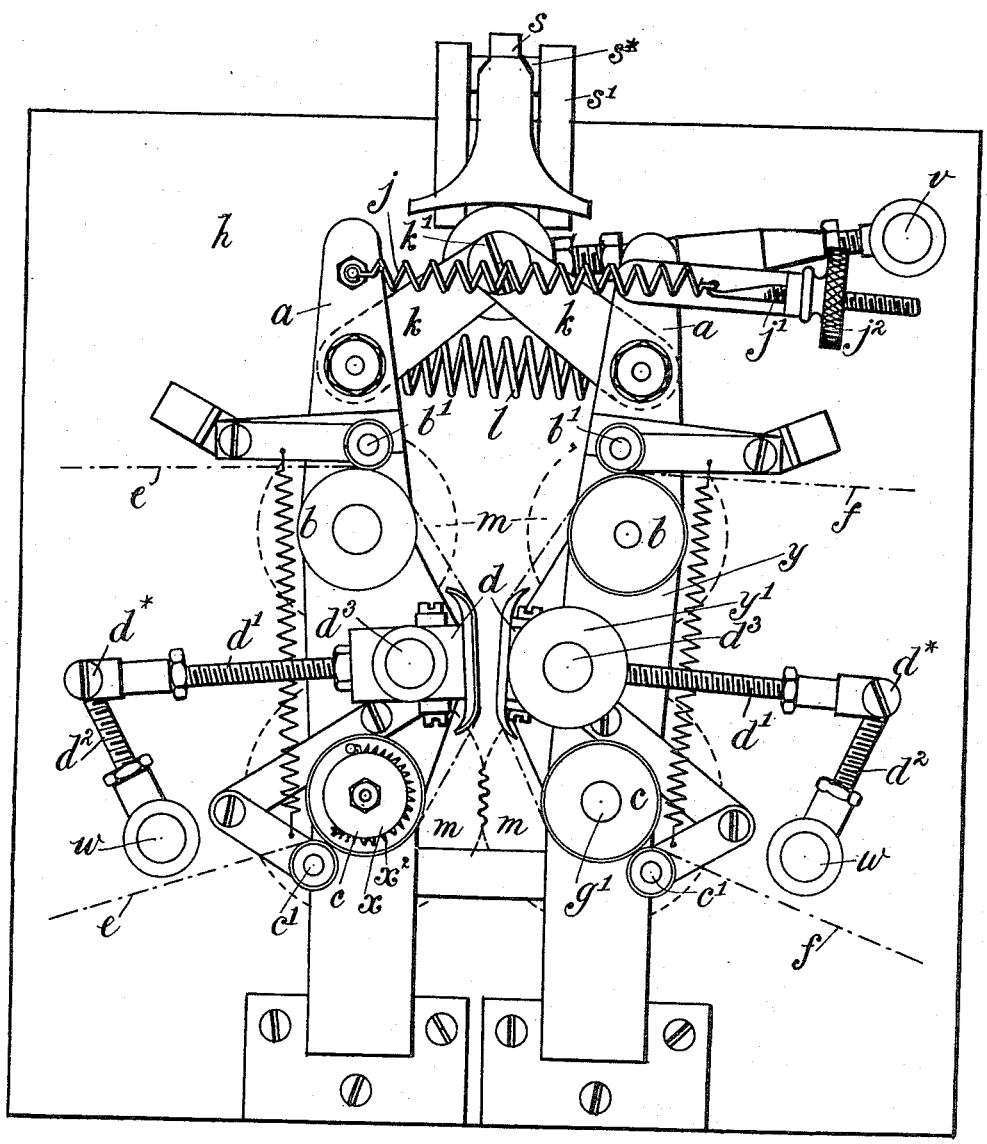
Figure 3:
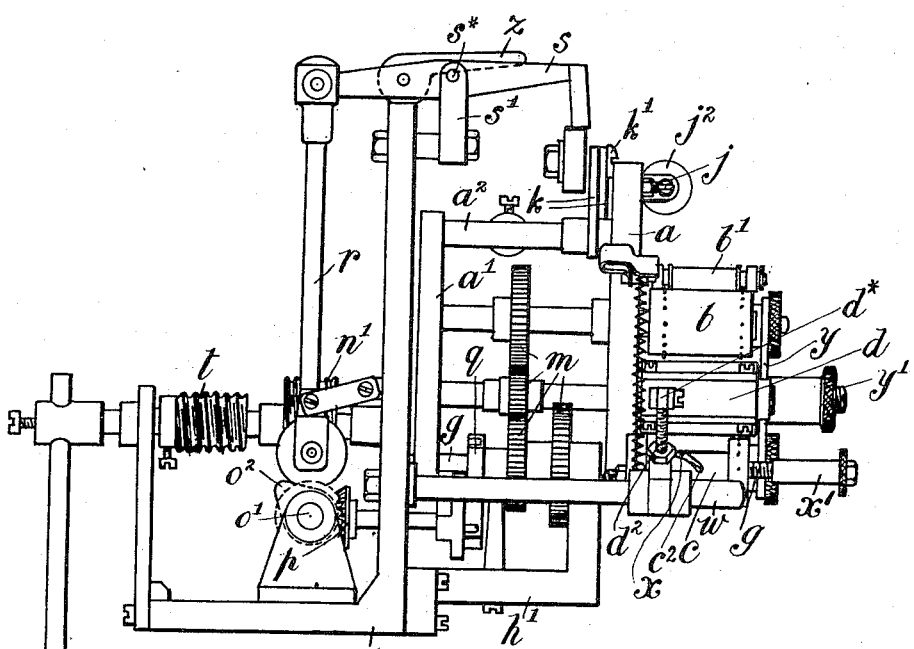
Figure 4:
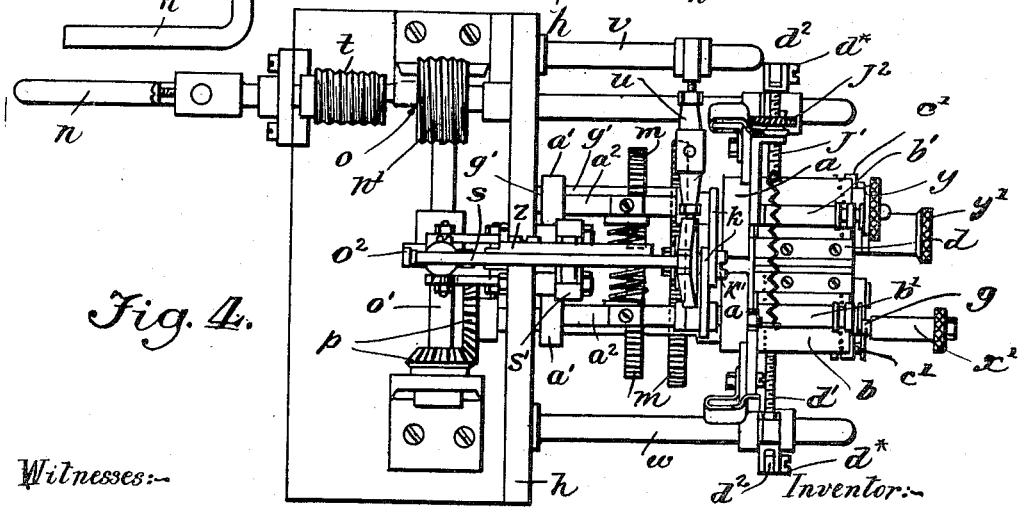

The machine above referred to may be constructed so that consecutive pictures and the corresponding consecutive images are successively pressed together, pressure being maintained on them while they pass through the machine a picture length, and then they are parted so as to permit their position to be adjusted in order to insure correct registration of the images. The machine is preferably constructed as follows, reference being had to the accompanying drawings wherein:

Figure 1 is a front elevation showing the position occupied by the parts of the machine when the positive film and the print plate (shown in broken lines) are under pressure between the pressure blocks. Fig. 2 is a similar view to Fig. 1 but shows the position of the parts of the machine when the pressure blocks are separated. Fig. 3 is a side elevation and Fig. 4 a plan of the machine as shown in Fig. 1, both of the Figs. 3 and 4 being on a smaller scale.

Referring to the drawings, on each of a pair of oppositely disposed arms $a, a$, upper and lower sprocket wheels $b, b$, and $c, c$, respectively are rotatably mounted between which latter pressure blocks $d, d$, are arranged. The mutually opposing faces of the pressure blocks are in the form of plates whose upper and lower edges are bent outward so as to ease the passage of the films over them, one of them being faced with a felt or the like pad $d^{**}$. In place of each of the pressure blocks a pair of rollers placed one above the other may be employed, the upper one constituting a pressure roller and the lower one a guide roller.

The print-plate passes from a bath of dye of the desired color, then under a jet of water which removes the dye from the clear celluloid but does not wash out the dye from the gelatin image, and subsequently between blotting rollers which blot off superfluous moisture from whence it passes into the machine; the parts of the apparatus just described are not shown in the drawings. The two films (the positive $e$ and the print plate $f$) are led into the machine over the upper sprocket wheels $b, b$, thence face to face between the pressure blocks, and then out of the machine under the lower sprocket wheels $c, c$. Spring-controlled pressure rollers $b', b'$, and $c', c'$, respectively press the films into contact with the sprocket wheels. The arms $a, a$, are connected to rear arms $a', a'$, (Figs. 3 and 4) by means of rods $a^2$, $a^2$, near their upper ends, and through the lower ends of the arms $a, a, a', a'$, shafts $g$ and $g'$, freely pass. These shafts take a bearing in a plate $h$ and also in brackets $h'$ fixed to the plate $h$, and the arms $a, a, a', a'$, rock upon them. Thus the said arms with their rods $a^2, a^2$, and shafts $g, g'$, constitute rocking frames. The lower sprocket wheels $c, c$, are mounted upon forward extensions of the shafts $g, g'$. The upper end of the two rocking frames are connected together by a spring $j$ in tension and toggles $k$, the tension of the spring being adjustable by means of a screw $j'$, and milled nut $j^2$. Between the upper ends of the two rocking frames is also placed a spring $l$ under compression. By suitably adjusting the tension of the spring $j$ the pressure on the films between the pressure blocks can be regulated with extreme nicety. The sprocket-wheels are geared together so as to run all at the same speed by means of gear wheels $m, m$, motion being transmitted from a handle *n* through worm *n'*, worm wheel *o* mounted on a shaft *o'*, bevel gearing *p*, and Maltese cross *q*, which latter imparts intermittent motion to the gear wheels. The pressure blocks are forced apart at the required time by means of a cam $o^2$ fixed on said shaft *o'* and operating on a rod *r*, and a lever *s* pivoted at $s^*$ in a fixed bracket *s'*. In the machine shown in the drawings the cam $o^2$ operates on the rod *r* once for every four revolutions of the handle *n* the speed ratio between the worm *n'* and worm wheel *o* being 4 to 1. When the cam $o^2$ rises, the front end of the lever *s* presses down the toggles *k* and thereby forces the arms *a*, *a*, and pressure blocks *d*, *d*, etc., apart into the position shown in Fig. 2.

The *modus operandi* is as follows: For convenience of description it will be assumed that the cam $o^2$ is at its highest point and that consequently the front end of the lever *s* has depressed the toggles *k* and separated the pressure blocks *d*, *d*, so that the front elevation of the machine would present the appearance shown in Fig. 2. The two films (the positive *e* and the print plate *f*) are now placed in position, as indicated in broken lines in Fig. 2, with the picture just ready to enter the space between the pressure blocks, and registration of the films secured, which may be done as hereinafter described. If now the handle *n* is turned, the pressure blocks will commence to approach each other and will be quite closed on the film at the end of ½ a revolution of the handle; the front elevation of the machine will appear as in Fig. 1. As the films come together a squeegee action is set up whereby air bubbles are squeezed out from and good and uniform contact is insured between the films. During the next ¾ of a revolution of the handle the Maltese cross *q* causes the sprockets to rotate and draw the film downward a picture length through and under the pressure of the pressure blocks. During the next 2¼ revolutions of the handle the sprockets are stationary and the films remain under the pressure of the pressure blocks. During the next ½ of a revolution of the handle the cam $o^2$ raises the rod *r* thereby causing the pressure blocks to open again. At this stage the front elevation of the machine again presents the appearance shown in Fig. 2, whereupon the cycle of operations of the machine is repeated. The films are carried on spools which are rotated through the medium of the worm *t* (Figs. 3 and 4) which is rotated by the handle *n*. A connecting piece *u*, adjustable in length is pivoted at its outer end on a fixed pin *v* and at its inner end on a pin *k'* which connects the inner ends of the toggles *k* together. The purpose of such connecting piece is to hold the toggles, rocking frames, etc., in position. In order that when the pressure blocks are separated there may not be any alteration in the position of the films on them, means such as those now to be described are employed.

The pressure blocks are provided at the rear with rods *d'*, *d'*, which are connected with arms $d^2$, $d^2$ adapted to rock on fixed pins *w*, *w*, which project from the plate *h*. Thus, as the pressure blocks separate the arms $d^2$, $d^2$, recede and each joint $d^*$, moves slightly downward along an arc of a circle whose center is coincident with the axis of the pin *w*, thereby causing the pressure blocks to turn slightly on their spindles $d^3$, $d^3$, and their faces to become slightly tilted.

The upper sprocket wheels *b*, *b*, contain springs which maintain the films under tension and also, when the pressure blocks are separated, allow the films to re-register themselves.

In order to obtain the registration of the films when necessary, the following device may be employed: For vertical movement the lower sprocket wheel on the left hand side of the machine is provided with a longitudinal spiral slot $c^2$ (Fig. 3) along which a pin *x* projecting through a longitudinal slot in the shaft *g* moves. The pin *x* projects from a rod which is located within the outer end portion of the shaft *g* and is attached to a nut *x'* screwed onto the outer end of this shaft. Thus by turning the nut *x'* the pin *x* causes the sprocket *c* to partially rotate and move the film vertically. The slot *c'* and pin *x* are maintained in constant engagement with one another by the pull of a spring $x^2$ (Figs. 1 and 2) which is secured at its ends to the sprocket *c* and shaft *g* respectively. In order to provide for lateral movement of one of the films the two sprockets *b* and *c* on the right hand side of the machine are connected by a yoke *y* in which, however, they are free to rotate. A nut *y'* has its inner end journaled in the yoke *y* and is secured on to an extension of the spindle $d^3$ of the right hand pressure block. Thus by turning the nut *y'* the sprockets *b* and *c* together with the film carried thereon are moved sidewise.

*z* is a lever, eccentrically pivoted to the lever *s* and bearing on the top edge of the plate *h*, by lifting which lever the front end of the lever *s* can be depressed for the purpose of separating the pressure blocks should it not be convenient to do this through the medium of the cam $o^2$.

I may, if desired, photograph or print portions of the picture direct on to the sensitized film.

I claim:—

1. A method of coloring a film consisting in making a stencil corresponding to the portion of the picture on the film to be colored, producing an image of the stencil on a separate film, coloring said image and subsequently transferring said coloring from said image to the film to be colored.

2. A method of coloring a film consisting in making an enlarged stencil corresponding to the portion of the picture on the film to be colored, producing a reduced image of the enlarged stencil on a separate film, coloring said image, and subsequently transferring said coloring from said image to the film to be colored.

3. A method of coloring a film consisting in cutting out a stencil corresponding to the portion of the picture to be colored from an enlarged image of said picture transmitted on to suitable material, producing a reduced image of the enlarged stencil on a separate film, coloring said image and subsequently transferring said coloring from said image to the film to be colored.

In witness whereof I have hereunto set my hand in the presence of two witnesses.

P. E. STOW.

Witnesses:
H. T. P. GEE,
H. D. JAMESON.